US008852396B2

(12) United States Patent
Rosset et al.

(10) Patent No.: US 8,852,396 B2
(45) Date of Patent: Oct. 7, 2014

(54) SHEET MATERIAL COMPRISING AT LEAST ONE WATERMARK HAVING A COLORED SHADE

(75) Inventors: Henri Rosset, Le Pin (FR); Ivan Thierry, Jouy sur Morin (FR)

(73) Assignees: Arjowiggins Security, Paris (FR); Arjowiggins, Paris (FR)

( * ) Notice: Subject to any disclaimer, the term of this patent is extended or adjusted under 35 U.S.C. 154(b) by 0 days.

(21) Appl. No.: 13/454,938

(22) Filed: Apr. 24, 2012

(65) Prior Publication Data

US 2012/0205062 A1 Aug. 16, 2012

Related U.S. Application Data

(63) Continuation of application No. 12/278,560, filed as application No. PCT/FR2007/050774 on Feb. 9, 2007, now Pat. No. 8,185,651.

(30) Foreign Application Priority Data

Feb. 9, 2006 (FR) ..................................... 06 50470

(51) Int. Cl.
| | |
|---|---|
| *D21H 21/40* | (2006.01) |
| *D21F 1/44* | (2006.01) |
| *D21H 19/66* | (2006.01) |
| *B32B 5/26* | (2006.01) |
| *D21H 21/28* | (2006.01) |
| *D21H 27/30* | (2006.01) |
| *D21F 9/04* | (2006.01) |
| *B23B 7/02* | (2006.01) |

(52) U.S. Cl.
CPC ... *B32B 5/26* (2013.01); *D21F 1/44* (2013.01); *D21H 19/66* (2013.01); *B32B 2262/062* (2013.01); *B32B 2307/404* (2013.01); *B32B 2307/4023* (2013.01); *B32B 2554/00* (2013.01); *B32B 2307/75* (2013.01); *B32B 2255/02* (2013.01); *Y10S 428/916* (2013.01); *D21H 21/28* (2013.01); *D21H 27/30* (2013.01); *Y10S 428/915* (2013.01); *B32B 2307/4026* (2013.01); *D21H 21/40* (2013.01); *D21F 9/043* (2013.01); *B23B 7/02* (2013.01)
USPC ........... 162/110; 162/125; 162/126; 162/127; 162/135; 162/140; 162/162; 428/172; 428/195.1; 283/72; 427/361; 428/916; 428/915

(58) Field of Classification Search
CPC ....... D21H 21/40; D21H 21/16; D21H 21/28; D21H 19/10; D21H 19/36; D21H 19/38; D21H 11/00; D21H 19/66; D21H 27/30; D21F 1/44; D21F 11/00; D21F 9/043; B42D 15/105; B32B 5/26; B32B 7/02; B32B 2255/02; B32B 2262/062; B32B 2307/4023; B32B 2307/4026; B32B 2307/404; B32B 2554/00; Y10S 428/915; Y10S 428/916
USPC ......... 162/110, 123, 125–128, 135–137, 140, 162/158, 162, 149; 283/72, 113–114; 428/195.1, 211.1, 172; 427/358, 361, 427/391
See application file for complete search history.

(56) References Cited

U.S. PATENT DOCUMENTS

| | | | |
|---|---|---|---|
| 38,835 | A | 6/1863 | Olier |
| 672,582 | A | 4/1901 | Affeltranger et al. |
| 987,678 | A | 3/1911 | Howes |
| 1,409,347 | A | 3/1922 | Kosuboski |
| 1,417,820 | A | 5/1922 | Goodman |
| 1,435,686 | A | 11/1922 | Basset |
| 1,687,140 | A | 10/1928 | Pleyer |
| 2,920,991 | A | 1/1960 | Fisher et al. |
| 4,504,357 | A | 3/1985 | Holbein et al. |
| 5,114,782 | A | 5/1992 | Nagafuchi |
| 5,161,829 | A | 11/1992 | Detrick et al. |
| 5,388,862 | A * | 2/1995 | Edwards .................... 283/82 |
| 5,565,276 | A | 10/1996 | Murakami et al. |
| 5,868,902 | A * | 2/1999 | Howland et al. .............. 162/140 |
| 5,928,471 | A * | 7/1999 | Howland et al. .............. 162/110 |
| 5,961,432 | A | 10/1999 | Murakami et al. |
| 6,045,656 | A | 4/2000 | Foster et al. |
| 6,054,021 | A * | 4/2000 | Kurrle et al. .................. 162/140 |
| 6,368,455 | B1 * | 4/2002 | Missell et al. ................ 162/140 |
| 6,402,888 | B1 | 6/2002 | Doublet et al. |
| 6,531,032 | B2 * | 3/2003 | Missell et al. ................ 162/140 |
| 6,582,556 | B2 * | 6/2003 | Missell et al. ................ 162/140 |
| 6,773,548 | B1 | 8/2004 | Thibierge et al. |

(Continued)

FOREIGN PATENT DOCUMENTS

| | | |
|---|---|---|
| DE | 29 05 441 C3 | 8/1980 |
| DE | 696 19 341 T2 | 10/2002 |

(Continued)

OTHER PUBLICATIONS

Mar. 9, 2011 Third Party Opposition from De La Rue International Limited issued in European Patent Application No. 07731599.2.

(Continued)

*Primary Examiner* — Jose Fortuna
(74) *Attorney, Agent, or Firm* — Jones Robb, PLLC (57) ABSTRACT

The present invention relates to a sheet material (2) comprising at least one first layer defining an outer surface of the sheet material and having at least one first color, at least one second layer comprising at least one watermark (6) and having at least one second color, the first and second colors having at least different saturations and/or hue angles.

6 Claims, 2 Drawing Sheets

(56) References Cited

U.S. PATENT DOCUMENTS

| | | | |
|---|---|---|---|
| 6,991,846 B2 | 1/2006 | Mallol et al. | |
| 7,041,364 B2 * | 5/2006 | Rancien | 428/211.1 |
| 7,049,267 B2 * | 5/2006 | Wagner et al. | 503/200 |
| 7,384,507 B2 * | 6/2008 | Bond | 162/140 |
| 7,431,798 B2 * | 10/2008 | Watson | 162/140 |
| 8,182,651 B2 * | 5/2012 | Rosset et al. | 162/110 |
| 2001/0018113 A1 | 8/2001 | Mallol et al. | |
| 2002/0088580 A1 * | 7/2002 | Missell et al. | 162/140 |
| 2002/0179266 A1 * | 12/2002 | Missell et al. | 162/140 |
| 2004/0007340 A1 * | 1/2004 | Watson | 162/140 |
| 2004/0023008 A1 | 2/2004 | Rosset | |
| 2004/0096635 A1 * | 5/2004 | Rancien | 428/211.1 |
| 2005/0064150 A1 * | 3/2005 | Bond | 428/195.1 |
| 2006/0127649 A1 | 6/2006 | Keller et al. | |
| 2006/0145468 A1 * | 7/2006 | Plaschka et al. | 283/72 |
| 2007/0128418 A1 | 6/2007 | Rosset | |
| 2009/0001709 A1 | 1/2009 | Krestschmar et al. | |
| 2009/0301676 A1 * | 12/2009 | Rosset et al. | 162/140 |
| 2009/0301696 A1 | 12/2009 | Iwasaki | |
| 2010/0006248 A1 * | 1/2010 | Haslop | 162/110 |
| 2010/0245928 A1 * | 9/2010 | Zhao et al. | 358/3.28 |
| 2010/0272313 A1 * | 10/2010 | Yamauchi et al. | 382/100 |
| 2010/0295291 A1 * | 11/2010 | Rancien et al. | 283/113 |
| 2012/0205062 A1 * | 8/2012 | Rosset et al. | 162/110 |

FOREIGN PATENT DOCUMENTS

| | | |
|---|---|---|
| DE | 694 22 705 T3 | 8/2006 |
| EP | 0 229 645 | 6/1991 |
| EP | 0 666 182 A1 | 8/1995 |
| EP | 0 773 320 A1 | 5/1997 |
| EP | 1 122 360 A1 | 8/2001 |
| FR | 2 769 927 A1 | 4/1999 |
| FR | 2897078 A1 * | 8/2007 |
| GB | 4419 | 0/1820 |
| GB | 1 435 686 | 5/1976 |
| GB | 2282611 A * | 4/1995 |
| GB | 2 321 471 A | 7/1998 |
| WO | WO 94/20679 A1 | 9/1994 |
| WO | WO 9509276 A1 * | 4/1995 |
| WO | WO 9628610 A1 * | 9/1996 |
| WO | WO 96/38630 A1 | 12/1996 |
| WO | WO 9814661 A1 * | 4/1998 |
| WO | WO 02/20902 A1 | 3/2002 |
| WO | WO 03044278 A2 * | 5/2003 |
| WO | WO 2004/028825 A2 | 4/2004 |
| WO | WO 2004/113612 A1 | 12/2004 |
| WO | WO 2005/003458 A1 | 1/2005 |
| WO | WO 2005/038135 A1 | 4/2005 |
| WO | WO 2006/099971 A2 | 9/2006 |
| WO | WO 2007/090999 A2 | 8/2007 |

OTHER PUBLICATIONS

Mar. 9, 2011 Third Party Opposition from Giesecke & Devrient GmbH issued in European Patent Application No. 07731599.2.

Hills, Extract from "Papermaking in Britain 1488-1988, III, The Art of Watermarking", The Athlone Press, 1988, pp. 30-44.

Dr. Ulrich Zoril, "Römpp Lexikon, Lacke and Druckfarben", 1998, Georg Thieme Verlag (pp. 221, 224, 225 and 451 with their English machine translation).

Auflage, Zweite, "Handbuch der Papier- and Pappenfabrikation" $2^{nd}$ Edition, 1971, Dr. Martin Sandig oHG (pp. 392-416 with English machine translation).

Roberts, John Christopher, "Paper Chemistry," Second Edition, selected pages, 1996.

Casey, James P., "Pulp and Paper Chemistry and Chemical Technology," Third Edition, 1981, pp. 1641-1651.

Observation Submitted to European Patent Office, dated Dec. 20, 2012, p. 1-7.

Observations par Giesecke Devrient du Dec. 18, 2012, p. 1-15.

A machine prepared English language translation of the third party "Observations par Giesecke Devrient du Dec. 18, 2012, p. 1-15".

* cited by examiner

SHEET MATERIAL COMPRISING AT LEAST ONE WATERMARK HAVING A COLORED SHADE

This is a continuation of U.S. patent application Ser. No. 12/278,560, filed Oct. 22, 2008, now U.S. Pat. No. 8,182,651 B2, which claims priority to International Application No. PCT/FR2007/050774, filed internationally on Feb. 9, 2007 and French Application No. 0650470, filed internationally on Feb. 9, 2006, each of which is incorporated herein in its entirety.

The present invention relates to a sheet material comprising at least one watermark.

It is known to use the watermarking technique to produce secure documents that must be protected against forgery attempts, these documents being, for example, bank notes means of payment, identification papers, travel documents, admission tickets for cultural or sporting events.

The presence of the watermark aims to make it impossible to copy the document by optical means such as photocopying, photography or digitization, because the medium of the copy does not contain the watermark from the original document.

Also known are watermarked papers used for decorative purposes, in particular for prestigious printing/writing papers, in particular papers for letterheads.

Watermarks are conventionally obtained by a molding or embossing operation of the wet sheet coming from the aqueous suspension of cellulose fibers during the manufacture of the paper. At this stage of manufacture, the cellulose fibers migrate easily in the aqueous suspension so that the aforementioned operation has the effect of increasing the concentration of fibers in the thickest areas of the sheet and reducing their concentration in the thinnest areas, the result obtained after drying the paper being that the latter comprises, when looked at in transmitted light, light areas low in fibers and dark areas with high fiber density.

The light areas are called low optical density areas, lower than that of vellum paper, the non-watermarked area of the paper and the dark areas are called high optical density areas, higher than that of vellum paper.

A need exists to improve further the security of sheet materials against forgery attempts.

A need also exists for watermarked papers, in particular in the field of fine papers or printing/writing papers, having a novel esthetic effect.

The subject of the invention is hence, according to one of its aspects, a sheet material, in particular for secure documents and/or value documents, comprising:
  at least one first layer defining, preferably, an outer surface of the sheet material and having at least one first color; and
  at least one second layer comprising at least one watermark and having at least one second color, the first and second colors having at least different saturations $C^*$ and/or hue angles h.

At least one of the layers may incorporate a dyeing agent in its mass, chosen so as to give said layer a colored shade over part or all of the surface of said layer.

The second layer is preferably a fibrous layer, in particular cellulose-fiber-based.

The expression "sheet material" in the description and the claims may denote a fibrous sheet based on cellulose and/or synthetic and/or non-cellulose organic fibers and/or mineral fibers that are capable of containing, where appropriate, various fillers and various additives currently used in the papermaking industry. The sheet material may have a monolayer (single-ply) or a multilayer (multi-ply), composite or non-composite, structure. A sheet material may, for example, have a relatively low thickness, in particular less than or equal to 1 mm, for example equal to around 100 µm, and be flexible.

All colors are possible. Preferably, however, neither of the two colors is the color white.

A "dyeing agent" is understood to be a soluble or insoluble agent able to color at least one of the layers in visible light.

A "colored shade" is understood to be a coloring appearing approximately continuous to the naked eye, in contrast to the coloring that may be obtained locally by incorporating fibers or flakes for example. A colored shade does not, however, exclude variations in hue. Conventionally, a colored shade is obtained by dispersing at least one dye and/or at least one pigment in the mass.

In an exemplary implementation of the invention, the sheet material may be conditioned on the reel, in particular before being cut to the desired format.

The various components of the color are defined in the CIE 1976 ($L^*$, $a^*$, $b^*$) or CIELAB color space. The value $a^*$ corresponds to the position on the red-green axis and the value $b^*$ to the position on the blue-yellow axis. The saturation $C^*$ corresponds to the quantity $(a^{*2}+b^{*2})^{1/2}$. The hue angle h corresponds to the quantity $\arctan(a^*/b^*)$. $L^*$ denotes the lightness.

The sheet material according to the invention has the advantage of being more complicated to reproduce due to the presence of different color layers and of at least one watermark that appears, in transmitted light, with a colored shade, such a watermark being relatively difficult to copy.

Furthermore, the invention allows, where appropriate, improvement of the esthetics of the sheet material using the color of the watermark and that of the outer surfaces of the material.

In an exemplary implementation of the invention, at least one of the first and second layers has a lightness $L^*$ greater than 70, in particular 80 or 90.

The second layer may, if desired, exhibit a color having a saturation $C^*$ less than 50, in particular of 35 or 20, so as to appear in reflection with a shaded, low saturation color.

The second layer preferably incorporates in its mass at least one dyeing agent.

This dyeing agent may be of any type, being for example chosen from: a direct dye, an acid dye, a basic dye, an organic or mineral pigment, this list not being limiting.

The aforementioned first and second colors may be due to different dyeing agents and/or to different concentrations respectively present in the mass of the first and second layers.

The watermark may appear, in transmitted light, with a color having a hue angle corresponding approximately to that of the second layer observed in reflection.

The most opaque areas of the second layer, which may be fibrous, corresponding to the dark areas of the watermark may, where appropriate, exhibit a more sustained saturation that that of the lower opacity areas corresponding to the light areas of the watermark.

The contrast between the dark areas and the light areas of the watermark depend in particular on the nature and on the color of the dye(s) incorporated in the mass of the second layer.

For example, the watermark may appear with a more marked contrast in transmitted light when the second layer has a blue shade, in relation to a yellow shade for example.

In an exemplary implementation of the invention, the first layer is a fibrous layer attached to the second layer, which may also be fibrous.

The two layers may, for example, define two opposite outer surfaces of the sheet material.

The first layer may comprise at least one watermark.

The sheet material may appear, in transmitted light, with a color corresponding to the superposition of the respective colors of the two layers, while the respective watermarks of the two layers appear with different colors, in particular with different hue angles, due to the more marked contrast of the watermarks.

The invention may thus make attempted forgery of the sheet material relatively difficult due to the presence of a set of watermarks of different colors.

In particular, the invention may eliminate attempted reproduction of a sheet material using an operation of making a paper transparent using an appropriate substance as this operation of making the paper transparent is achromatic and therefore does not permit watermarks of different colors to be obtained.

The invention may in addition enable varied visual effects to be created.

The watermarks may, if desired, have colors reproducing those of a national flag, for example.

In an exemplary implementation of the invention, the watermarks of the two layers are arranged in such a way as to cooperate when the material is observed in transmitted light to form a composite pattern, the watermarks comprising for example, adjacent and or superposed portions. These watermarks may be arranged such that one is located relative to the other.

The composite pattern may be chosen from at least one of the following elements: an alphanumeric character, a symbol, a logo or a drawing.

The composite pattern comprises for example a portrait formed by a first watermark reproducing a face of a person and appearing in transmitted light with, for example, a pink shade and a second watermark reproducing the hair of the person and appearing in transmitted light with, for example, a yellow shade.

The invention thus enables a multicolor watermark to be reconstructed.

In another exemplary implementation of the invention, the first layer is without a watermark.

The sheet material may, where appropriate, comprise more than two, possibly fibrous, layers, for example three or four layers, at least some of which may comprise a watermark and have different colors.

The total thickness of the sheet material may be chosen such that its opacity does not appreciably affect the contrast of the watermark(s) observed in transmitted light.

The sheet material may, where appropriate, comprise a third coating layer comprising at least one dyeing agent, the three layers notably having different colors.

In an exemplary implementation of the invention, the first layer is a coating layer, deposited for example on the second layer.

A "coating layer" is conventionally understood to be a layer covering approximately the entire surface of the sheet material, thus constituting the outer surface of this material. A coating layer may be fibrous or nonfibrous.

The coating layer preferably comprises at least one dye.

The second layer may comprise at least one sizing agent in its mass.

The watermark of the second layer, especially when fibrous, observed in light transmitted through the coating layer, may appear with a color corresponding approximately to the color of this second layer.

The contrast, in transmitted light, between the color of the watermark and that of the outer surface, defined by the coating layer, may depend in particular on the choice of the color of the second layer and on that of the coating layer.

In an exemplary implementation of the invention, the sheet material comprises two coating layers defining two outer surfaces of the sheet material.

In an exemplary implementation of the invention, the coating layer penetrates the mass of the second layer, only over part of the thickness of this second layer.

This coating layer may, for example, be deposited by a surfacing treatment using a size press or by impregnation of the second layer.

The coating layer may, in a variant, be deposited by coating the second layer.

The coating layer may extend approximately only at the surface of the second layer, without penetrating the mass thereof, and in particular enable improvement of the printing result of the sheet material.

The coating layer may comprise, where appropriate, coating pigments.

This coating layer may be transparent or translucent and, for example, comprise at least one colloidal silica.

Reference may be made in particular to international application WO 02/20902, which describes an example of such a coating layer.

The coating layer may be a binder-based surface layer, advantageously arranged to give the structure printability characteristics and/or specific properties such as a variable optical effect.

The surface layer may be different from a lacquer. The surface layer may, in particular, be a composition comprising coating or surfacing pigments and at least one binder. The pigments may be natural or synthetic mineral pigments, in particular of kaolin and/or calcium carbonate and/or silica, possibly pyrogenic, and/or titanium dioxide, possibly pyrogenic, or even iridescent pigments, in particular of the mica-titanium type, or even plastic pigments, for example hollow plastic microspheres based on a styrene polymer, in particular on styrene acrylic. The mean diameter of the microspheres is in particular between 0.5 mm and 1.0 mm.

This layer may comprise at least one binder, in particular a starch or the synthetic binders usual in the papermaking industry, together with, optionally, any additives currently used by the person skilled in the art with the function of improving the rheological properties of the coating slip and of providing the layer with particular properties. The weight of the layer may be between 2 and 50 g/m$^2$ on one or each surface, that is, including a surfacing having a layer weight of between 2 and 10 g/m$^2$.

In a particular embodiment, the pigmented layer comprises to 95% of pigments and 5 to 30% of binders, not counting additives.

According to a particular embodiment, the surface layer is at least translucent and comprises 30 to 50 parts by dry weight of pyrogenic silica and 50 to 70 parts by dry weight of an elastomer binder, in particular a polyurethane, the sum of the parts of these components being 100 in total, the weight of the deposited layer is between 1 and 15 g/m$^2$ per dry surface, preferably between 1 and 10 g/m$^2$ per surface, more preferably still between 2 and 7 g/m$^2$ per dry surface. The layer may comprise other dispersing agent additives, viscosity changing agents, plasticizers, bacteriostatic agents, fungicides for example. It is not excluded that it comprises other authentication or anti-forgery agents.

The sheet material may comprise two opposite outer surfaces having different colors in reflection under visible light, in particular different saturations and/or hue angles.

As a variant, the two outer surfaces have approximately identical colors in reflection under visible light.

The sheet material, in particular the second layer, may preferably comprise at least one watermark having a plurality of tones, for example shaded tones, for example an intaglio watermark.

The watermark may be a light watermark or a dark watermark.

In an exemplary implementation of the invention, the material may comprise at least one watermark with a multitone effect comprising a set of light areas arranged to form a half-tone image with light and dark tones. This half-tone image may comprise half-tone patterns formed, for example, by lines. The light areas of the watermark have a mass surface density strictly less than the vellum part of the remainder of the fibrous layer.

The sheet material may receive at least one subsequent printing.

The sheet material may comprise at least one authentication and/or identification element, chosen in particular from at least one of the following elements: an element for demonstrating forgery, in particular one that is visible and/or detectable using a specific detection device, an element with a variable, interferential and/or diffractive or iridescent optical effect, a liquid crystal element, a magnetic coating, markers detectable with X-ray fluorescence, biomarkers, a lacquer or an ink, luminescent, fluorescent or phosphorescent markers, photochromic, thermochromic, electroluminescent and/or piezochromic compounds and/or compounds that change color on contact with one or more predetermined products.

The sheet material may, where appropriate, comprise a wire or strip security element.

This security element may be at least partially incorporated in the sheet material, in particular between two fibrous layers, or be incorporated in the mass of one of the fibrous layers. This element may be incorporated totally in the material, or as a variant, partially incorporated so as to appear in windows on one surface of the material, at least one of the windows possibly passing through.

The sheet material may comprise a security element attached to an outer surface of the sheet material. This element comprises, for example, a patch or foil.

In an exemplary implementation of the invention, the sheet material is arranged so that it can appear with at least three different colors.

The production of at least one of the first and second layers may be based on cellulose and/or synthetic fibers.

Said at least one agent for dyeing the sheet material according to the invention may consist of a fluorescent agent that appears colored in visible light. In one embodiment, the fluorescent dyeing agent displays a colored effect under ultraviolet (UV) or infrared (IR) light.

A colored or non-colored fluorescent agent that is visible or invisible in visible light may also be added to the layer(s) containing said at least one agent for dyeing the sheet material according to the invention and/or to a different layer.

In a particular embodiment, the first and second layers incorporate first and second fluorescent agents respectively, the first and second fluorescent agents appearing different in visible light and/or in invisible light. At least one of the fluorescent agents, preferably both the fluorescent agents, is/are incorporated in the mass and provide a colored shade to the layer in which they are incorporated.

The subject of the invention is also a sheet material comprising:
at least one first layer; and
at least one second layer;
the first and second layers incorporating first and second fluorescent agents respectively.

The first and/or second fluorescent agent(s) may appear colored in visible light and/or invisible light, in particular under UV or IR light. The first fluorescent agent may have a different color to that of the second fluorescent agent in visible light and/or non-visible light. In particular, the color of the first fluorescent agent in visible light may correspond to the color of the second fluorescent agent in non-visible light and the color of the first fluorescent agent in non-visible light correspond to the color of the second fluorescent agent in visible light. The transition from illumination in visible light to illumination in invisible light then inverts the colors.

The first and second fluorescent agents may cover first and second areas respectively, the first and second areas being arranged so as to form, in visible and/or invisible light, a coherent whole such as an image, a message, or a pattern.

The subject of the invention is also a sheet material comprising:
at least one first layer; and
at least one second layer;
at least one of the first and second layers incorporating at least one dyeing agent, the other of said layers incorporating at least one fluorescent agent that is invisible in visible light. The dyeing agent may be a fluorescent agent displaying a colored effect under UV or IR light. In one embodiment, one layer does not comprise a fluorescent agent and the other layer does not comprise a dyeing agent.

In all the embodiments employing a fluorescent agent, the fluorescent agent may be visible, for example under ultraviolet (UV) or infrared (IR) light. Like the dyeing agents, it may be particulate or dissolved, a dye or a pigment.

Generally speaking, the fluorescent agent(s) may cooperate with each other and/or with dyeing agents and/or with one or more watermarks incorporated in particular in the first and/or the second layer in order to define a coherent whole such as an image, a message or a pattern in visible or invisible light, by transparency or otherwise. The watermarks and/or the dyeing agents and/or the fluorescent agents may have different colors depending on the layers in which they are incorporated.

In all the embodiments employing a fluorescent agent, the sheet material may also comprise one or more of the features of the previously described material not containing a fluorescent agent, in particular one or more of the features relating to the nature of the dyeing agents, to the arrangement of areas comprising a dyeing agent, to the presence of watermarks, to the nature and the position of the layers, to the incorporation of dyeing agents in the mass so as to provide a colored shade etc. The first layer may in particular be a fibrous layer or a coating layer deposited by a surfacing treatment, in particular on the second layer, as previously described. It may be an outer layer. The second layer may also be a fibrous layer, in particular based on cellulose fibers.

The subject of the invention is also, according to another of its aspects, an article, in particular a secure document or a value document or a packaging device comprising a sheet material such as defined above.

The document may constitute one of the following elements: a bank note, an identification document, a passport page or cover, a visa, a coupon, a value document other than a bank note, for example a check, a protective label and/or authentication label, a traceability marker.

The packaging device comprises for example a piece of packaging.

The subject of the invention is also, according to another of its aspects, a method for manufacturing a sheet material comprising:
- at least one first layer defining an outer surface of the sheet material and having at least one first color; and
- at least one second fibrous layer comprising at least one watermark and having at least one second color, the first and second colors having at least different saturations and/or hue angles;

the method comprising the following step:
- producing the watermark of the second fibrous layer in the wet state, in particular using a papermaking machine, in particular a cylinder vat machine or a Fourdrinier machine, the watermark comprising in particular portions having a mass surface density different to that of the rest of the sheet material.

The watermark may be produced conventionally on an embossed web of a cylinder mold or using a watermark roll (also called a dandy roll) on a fourdrinier.

According to another exemplary implementation of the invention, the watermark may be produced according to the method described in the patent application EP 1 122 360, using a set of masks present on the web of the papermaking machine, the watermark obtained comprising a set of clear areas arranged to form a half-tone image.

When the sheet material comprises first and second fibrous layers, the method may comprise the following steps:
- forming the two fibrous layers on two cylinder molds of the papermaking machine; and
- joining the two fibrous layers while they are still wet.

In an exemplary implementation of the invention, the method comprises the following step:
- depositing a first coating layer on the second fibrous layer, in particular using a size press, an impregnation device or a coating device used in the papermaking industry, for example of the air knife or curtain coating type.

In order to avoid altering the color in the mass of the watermark it is advantageous to limit, or even prevent, penetration of the dyeing agent of the coating layer into the mass of the fibrous layer comprising said watermark.

This may be carried out, for example, by adding a sizing agent to the mass of said fibrous layer. The sizing agent may be based on alkyl ketene dimer, also known by the abbreviation AKD, or based on alkenyl succinic anhydride, also known by the abbreviation ASA, or on rosin for example.

The present invention will be able to be better understood on reading the following detailed description of nonlimiting exemplary implementations of the invention and on examining the appended drawings in which.

In the interests of clarity, in the drawings the relative proportions of various represented elements have not always been respected, as the views are schematic.

Figures 1, 2, 3, 4, 5:
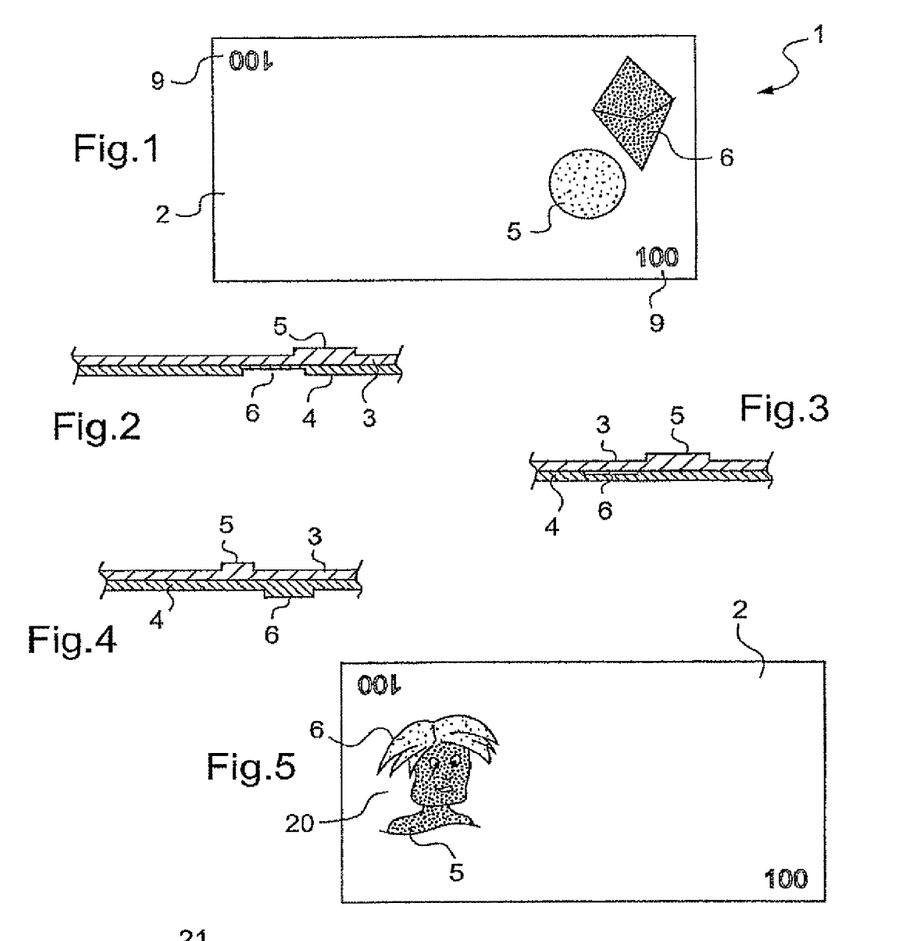
FIG. 1 schematically and partially represents a secure document and/or a value document according to the invention.
FIGS. 2 to 4 are schematic and partial cross-sectional views of the document of FIG. 1 according to different exemplary embodiments.
FIG. 5 schematically and partially represents a secure document and/or a value document according to another exemplary implementation of the invention, observed in transmitted light.

FIG. 1 shows a secure document and/or a value document 1 comprising a sheet material 2 and having printing 9.

In the example considered, the document 1 is a bank note.

As a variant, the document may be chosen from among: an identification document, a passport page, a visa, a coupon, a value document other than a bank note, for example a check, a protective label and/or authentication label, a traceability marker, a letterhead or paper for advertising purposes for example.

The sheet material 2 comprises first 3 and second 4 joined fibrous layers, each having at least one watermark 5 and 6 respectively.

The sheet material 2 may be manufactured in the following manner (see FIG. 12).

The first fibrous layer 3 may be formed on a first cylinder mold 11 of a papermaking machine 10 comprising two cylinder molds, the second fibrous layer 4 being formed on a second cylinder mold 12 of this machine 10.

Each cylinder mold 11, 12 comprises a vat 13 containing a suspension of fibers 14, for example cellulose fibers, in which a rotating web cylinder 15 defining a surface 16 in contact with which the corresponding fibrous layer 3, 4 is continuously formed.

The two fibrous layers 3 and 4 are joined while they are still wet by passing between one cylinder 15 and another rotating cylinder 17.

Figures 8, 9, 10, 11, 12, 13:
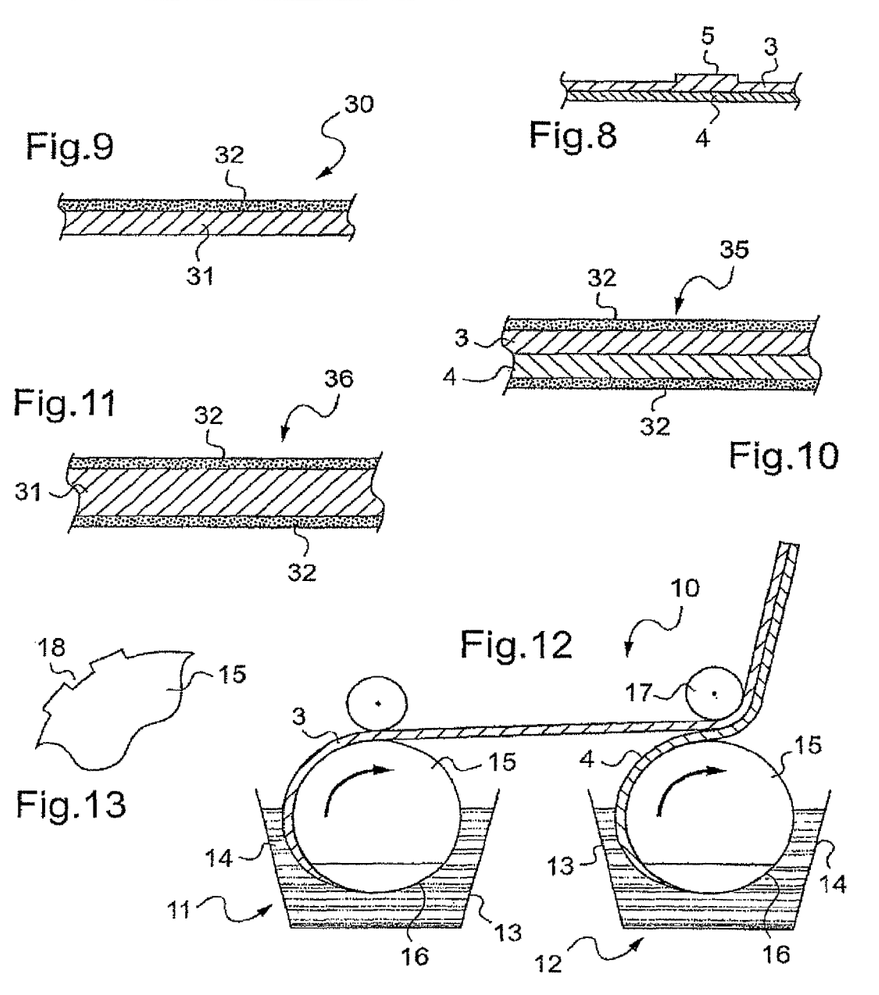
FIGS. 8 to 11 schematically and partially represent, in cross section, a sheet material according to various exemplary implementations of the invention.
FIG. 12 schematically illustrates a step in the manufacture of a sheet material according to the invention.
FIG. 13 is a schematic and partial detail view of a forming web from the papermaking machine illustrated in FIG. 12.

In order to form one or more watermarks on the fibrous layers 3 and 4, each rotating web cylinder 15 comprises one or more embossings 18 comprising recessed and/or projecting areas, as illustrated in FIG. 13.

For example, the rotating web cylinder 15 of the first cylinder mold 11 may comprise recessed areas so as to form a dark watermark 5 on the fibrous layer 3, the dark areas of the watermark 5 resulting from an accumulation of fibers in the recessed areas of the cylinder 15 during the formation of the layer 3.

The cylinder 15 of the second cylinder mold 12 may comprise raised areas so as to form a light watermark 6 on the fibrous layer 4, the light areas of the watermark 6 resulting from a lower fiber density.

The layers 3 and 4 may be joined in such a way that the watermark 6 of the layer 4 is turned in an opposite direction to the layer 3, as illustrated in FIG. 2.

As a variant, as illustrated in FIG. 3, the layers 3 and 4 may be joined in such a way that the watermark 6 is directed towards the layer 3.

The rotating web cylinders 15 of the cylinder molds 11 and 12 may be arranged in such a way that the watermarks and 6 of the layers 3 and 4 respectively are dark watermarks, as illustrated in FIG. 4.

In another exemplary implementation of the invention, at least one of the layers 3 and 4 comprises an intaglio or multitone-effect watermark.

The watermarks 5 and 6 may in particular be intaglio watermarks having shaded tones.

In another exemplary implementation of the invention, at least one of the watermarks 5 and 6 comprises a set of light areas arranged to form a half-tone image with a multitone effect.

Such a watermark may be obtained by a method described, for example, in the patent application EP 1 122 360.

In the example being considered, the suspension 14 of fibers from the cylinder mold 11, or the cylinder mold 12 respectively, contains a dyeing agent chosen so as to give the fibrous layer 3, or the fibrous layer 4 respectively, a colored shade.

The dyeing agent may be of any type, being for example chosen from: a direct dye, an acid dye, a basic dye, an organic or mineral pigment, this list not being limiting.

The dyeing agent may be chosen in such a way that the fibrous layers 3 and 4 respectively have first and second colors with at least different saturations $C^*$ and/or hue angles h.

The first and second layers 3 and 4 may, for example, have a lightness $L^*$ greater than 70, in particular 80 or 90.

The fibrous layers 3 and 4 may have a color with a saturation less than 50, in particular 35 or 20, so as to appear, in reflection in visible light, with a shaded, low saturation color.

The sheet material 2 may thus appear, in transmitted light, with a color corresponding to the superposition of the respective colors of the two fibrous layers 3 and 4, while the respective watermarks 5 and 6 appear with different colors, in particular with different hue angles, due to the more marked contrast of the watermarks, as illustrated in FIG. 1.

Each watermark 5, 6 may define a pattern chosen from one of the following elements: an alphanumeric character, a symbol, a logo or a drawing.

The watermarks 5, 6 may be arranged so as to cooperate when the sheet material 2 is observed in transmitted light to form a composite pattern 20, as illustrated in FIG. 5.

The composite pattern 20 comprises, for example, a portrait formed by the first watermark 5 reproducing a face of a person and appearing in transmitted light with, for example, a pink shade and the second watermark 6 reproducing the hair of the person and appearing in transmitted light with, for example, a yellow shade.

The invention thus allows new optical effects to be created, and in particular a watermark with a multicolored appearance to be created.

Figure 6:
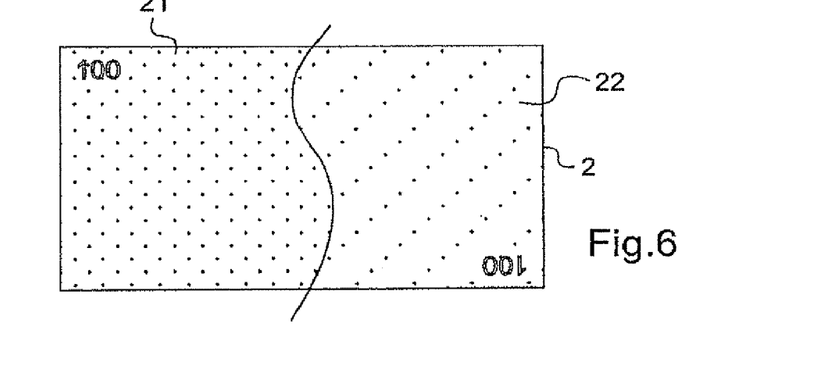
FIG. 6 schematically and partially represents the appearance of the two opposite surfaces of the document of FIG. 5, observed in reflection.

When observed in reflection under visible light the opposite surfaces 21 and 22 of the sheet material 2 appear with different colors, in particular with different saturations and/or hue angles, as illustrated in FIG. 6.

Examples of embodiments of the sheet material 2 are given below.

EXAMPLE 1

The sheet material 2 is obtained by forming a two-ply paper comprising two plies (or fibrous layers) 3 and 4 joined at the wet end, each of the fibrous layers having a basis weight of 60 g/m².

The layer 3 has a blue shade through addition into the fibrous mass of a blue dye marketed under the reference Fexonyl B2G LA at 0.0125 commercial parts per 100 parts of cellulose. This layer 3 comprises a watermark representing a first portrait.

The layer 4 has a pink shade through addition into the fibrous mass of a red dye marketed under the reference Cartasol EBE at 0.05 commercial parts per 100 parts of cellulose. This layer 4 comprises a watermark representing a second portrait.

In reflected light, the sheet material appears two-colored, shaded pink on one surface and shaded blue on the other surface.

In transmitted light, the shade of the vellum area is "old rose" while the watermarks retain the basic shade of their respective fibrous layer. Thus a first blue portrait and a second pink portrait are observed.

Measurements in the CIELAB space were carried out under a D65/10° illuminant and are reproduced in the table below.

| Measurement | $L^*$ | $a^*$ | $b^*$ | $C^*$ |
|---|---|---|---|---|
| Blue shaded surface | 93.5 | −1.86 | −2.61 | 3.2 |
| Pink shaded surface | 93.3 | 3.3 | −1.98 | 3.84 |

EXAMPLE 2

The sheet material 2 is obtained by forming a two-ply paper comprising two plies, or fibrous layers, 3 and 4 joined at the wet end, each of the fibrous layers having a basis weight of 50 g/m².

The layer 3 has a blue shade through addition into the fibrous mass of a blue dye marketed under the reference Cartaren FBLA at 0.2 commercial parts per 100 parts of cellulose. This layer 3 comprises a watermark representing a first portrait.

The layer 4 has a yellow shade through addition into the fibrous mass of a yellow dye marketed under the reference NCG LA at 0.25 commercial parts per 100 parts of cellulose. This layer 4 comprises a watermark representing a second portrait.

In reflected light, the sheet material appears two-colored, shaded blue on one surface and shaded yellow on the other surface.

In transmitted light, the shade of the vellum area is blue-green while the watermarks retain the basic shade of their respective fibrous layer. Thus a first blue portrait and a second yellow portrait are observed.

Measurements in the CIELAB space were carried out under a D65/10° illuminant and are reproduced in the table below.

| Measurement | $L^*$ | $a^*$ | $b^*$ | $C^*$ |
|---|---|---|---|---|
| Blue shaded surface | 85.79 | −15.76 | −9.49 | 18.39 |
| Yellow shaded surface | 90.36 | −9.47 | 6.31 | 11.38 |

EXAMPLE 3

The sheet material 2 is obtained by forming a two-ply paper comprising two plies, or fibrous layers, 3 and 4 joined at the wet end, each of the fibrous layers having a basis weight of 50 g/m².

The layer 3 has a blue shade through addition into the fibrous mass of a blue dye marketed under the reference Cartaren FBLA at 0.12 commercial parts per 100 parts of cellulose. This layer 3 comprises a watermark representing a first portrait.

The layer 4 has a pink shade through addition into the fibrous mass of a red dye marketed under the reference Cartasol EBE at 0.2 commercial parts per 100 parts of cellulose. This layer 4 comprises a watermark representing a second portrait.

In reflected light, the sheet material appears two-colored, shaded blue on one surface and shaded pink on the other surface.

In transmitted light, the shade of the vellum area is "old rose" while the watermarks retain the basic shade of their respective fibrous layer. Thus a first blue portrait and a second pink portrait are observed.

Measurements in the CIELAB space were carried out under a D65/10° illuminant and are reproduced in the table below.

| Location measurement | L* | a* | b* | C* |
|---|---|---|---|---|
| Blue shaded surface | 88.03 | −7.58 | −7.70 | 10.8 |
| Pink shaded surface | 87.92 | 5.88 | −5.15 | 7.81 |

The sheet material 2 may comprise a fibrous layer 3 or 4 without a watermark.

Figure 7:
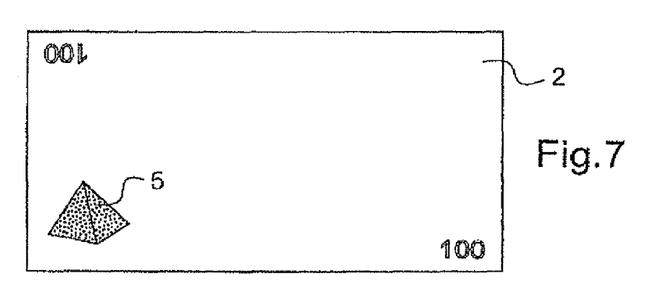
FIG. 7 schematically and partially represents a secure document and/or a value document according to another exemplary implementation of the invention.

For example, the fibrous layer 3 alone includes a watermark 5, as illustrated in FIG. 8, so that the sheet material 2 causes a monochrome watermark to appear in transmitted light, as illustrated in FIG. 7.

In the examples that have just been described, the sheet material 2 comprises two joined fibrous layers.

It remains within the scope of the present invention if the sheet material comprises a single fibrous layer with a watermark and a shaded layer deposited on said fibrous layer.

FIG. 9 represents, in cross section, a sheet material 30 comprising a single fibrous layer 31 including a watermark, which is not shown, and a coating layer 32 deposited onto the fibrous layer 31, for example using a size press or an impregnation device.

The coating layer 32 comprises a dye so that the surface of the sheet material 30 defined by the coating layer 32 appears, in reflection, with a color different to that of the fibrous layer 31.

In the example being considered, this fibrous layer 31 comprises a dyeing agent incorporated in its mass and the watermark produced on this layer 31 appears in transmitted light with a colored shade corresponding approximately to the color of this layer 31.

FIG. 10 represents a sheet material 35 comprising two joined fibrous layers 3 and 4, each comprising a watermark, as described with reference to FIGS. 2 to 4.

Two coating layers 32 are deposited on the outer surfaces of the fibrous layers 3 and 4.

An example of the material 35 is given below.

EXAMPLE 4

The two-ply paper from Example 1 is used.

This paper receives a yellow coating layer on its opposite surfaces through surface treatment by a size press, the yellow dye being that marketed under the reference NCG LA at 0.5% as a commercial dose. This dose corresponds roughly to a rate of transfer of yellow dye to the paper of around 0.25 commercial parts per 100 parts of paper.

| Measurement | L* | a* | b* | Saturation |
|---|---|---|---|---|
| Yellow shaded surface | 90.97 | −10.28 | 28.59 | 30.38 |

The sheet material 35 has a yellow shade in reflection, and a blue first portrait and a pink second portrait in transmitted light.

FIG. 11 represents a sheet material 36 comprising a fibrous layer 31 colored in the mass and having a watermark and two coating layers 32, deposited on the opposite surfaces of the fibrous layers 31.

An example of the sheet material 36 is given below.

EXAMPLE 5

The sheet material 30 comprises a single-ply paper with a basis weight of 85 g/m².

The paper or fibrous layer 31 has a blue shade through addition into the fibrous mass of a blue dye marketed under the reference Fexonyl B2G LA at 0.01 commercial parts per 100 parts of cellulose. This layer 31 comprises a watermark showing a portrait.

The surface of the wet fibrous layer is treated by a size press to deposit a yellow dye marketed under the reference NCG LA at 0.5% as a commercial dose. This dose corresponds roughly to a rate of transfer of yellow dye to the paper of around 0.25 commercial parts per 100 parts of paper.

| Measurement | L* | a* | b* | C* |
|---|---|---|---|---|
| Blue shade vellum (before yellow coating) | 94.9 | −5.34 | −2.31 | 5.81 |
| Vellum (after yellow coating) | 92.05 | −13.95 | 33.8 | 36.56 |

Of course, the invention is not limited to the exemplary implementations that have just been described.

It is possible to produce, for example, a sheet material with at least three fibrous layers with relatively low thicknesses so as not to reduce the contrast of the watermarks present on the fibrous layers unduly.

As a variant, it is possible, for example, to produce a sheet material with two fibrous layers, each with at least one watermark, and a third coating layer deposited on one of the two fibrous layers, for example using a size press. The three layers are preferably of different colors.

Each surface of the sheet material may, where appropriate, be of more than one color.

The expression "comprising a" should be understood as being synonymous with "comprising at least one", unless specified to the contrary.

The invention claimed is:

1. A sheet material, comprising:
   at least one first layer having at least one first color; and
   at least one second layer comprising at least one watermark having at least one second color, that differs from the first color,
   wherein the first layer incorporates at least one dyeing agent in its mass, said at least one dyeing agent of the first layer chosen so as to give said first layer a colored shade appearing approximately continuous to the naked eye, and
   wherein the second layer is a fibrous layer comprising a dyeing agent incorporated in its mass and at least one internal sizing agent configured for limiting or preventing penetration of the at least one dyeing agent of the first layer into the mass of the fibrous second layer comprising said watermark.

2. A sheet material according to claim 1, wherein the first layer is a fibrous layer.

3. A sheet material, according to claim 1, wherein the first layer is a coating layer deposited by a surfacing treatment, by impregnation of the second layer or by coating onto the second layer.

4. A sheet material according to claim 3, wherein the coating layer is nonfibrous.

5. A sheet material according to claim 3, wherein the coating layer is fibrous.

6. A sheet material according to claim 3, wherein the at least one dyeing agent is chosen from a direct dye, an acid dye or a basic dye.

* * * * *

UNITED STATES PATENT AND TRADEMARK OFFICE
CERTIFICATE OF CORRECTION

PATENT NO. : 8,852,396 B2  Page 1 of 1
APPLICATION NO. : 13/454938
DATED : October 7, 2014
INVENTOR(S) : Henri Rosset and Ivan Thierry It is certified that error appears in the above-identified patent and that said Letters Patent is hereby corrected as shown below:

Title Page, Item (63), last line:
Replace "Pat. No. 8,185,651" with --Pat. No. 8,182,651--.

Signed and Sealed this
Twenty-fourth Day of March, 2015

Michelle K. Lee
*Director of the United States Patent and Trademark Office*